(12) United States Patent
Toji

(10) Patent No.: US 8,081,859 B2
(45) Date of Patent: Dec. 20, 2011

(54) RECORDING DEVICE

(75) Inventor: Shigeru Toji, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1186 days.

(21) Appl. No.: 11/822,088

(22) Filed: Jul. 2, 2007

(65) Prior Publication Data

US 2008/0025695 A1 Jan. 31, 2008

(30) Foreign Application Priority Data

Jul. 28, 2006 (JP) .................................. 2006-205737

(51) Int. Cl.
*H04N 5/765* (2006.01)
(52) U.S. Cl. ......... 386/200; 386/227; 386/234; 386/359
(58) Field of Classification Search .................. 386/227, 386/234, 359
See application file for complete search history.

(56) References Cited

U.S. PATENT DOCUMENTS

| | | | |
|---|---|---|---|
| 6,181,921 B1 | 1/2001 | Konisi et al. ............... | 455/186.2 |
| 2001/0022630 A1* | 9/2001 | Nakagawa et al. ........... | 348/730 |
| 2004/0133919 A1 | 7/2004 | Incentis ........................ | 725/112 |
| 2008/0065315 A1* | 3/2008 | Guy et al. ..................... | 701/200 |

FOREIGN PATENT DOCUMENTS

| | | |
|---|---|---|
| JP | 2002-209166 | 7/2002 |
| JP | 2003-174376 | 6/2003 |
| JP | 2004-023111 | 1/2004 |
| JP | A-2005-064718 | 3/2005 |
| JP | A-2006-086730 | 3/2006 |

* cited by examiner

*Primary Examiner* — Thai Tran
*Assistant Examiner* — Jose Mesa
(74) *Attorney, Agent, or Firm* — Morgan, Lewis & Bockius LLP

(57) ABSTRACT

When a recording device is connected to a power source and a main power is supplied, position information of the recording device is obtained by using GPS satellites. A region where the recording device is installed is decided based on the obtained position information. Channel information appropriate for the decided region is read out from a storage medium such as a memory, and a tuner of the recording device is set automatically using the read channel information thus read. Additionally, when the position information is obtained, it is decided whether or not the position where the recording device is installed is within a predetermined distance from a boundary between regions. If it is adjacent to other region, a plurality of region codes are read out, and a request for selecting one to perform the channel setting is displayed using a display panel or an OSD function so that the selection can be received.

4 Claims, 3 Drawing Sheets

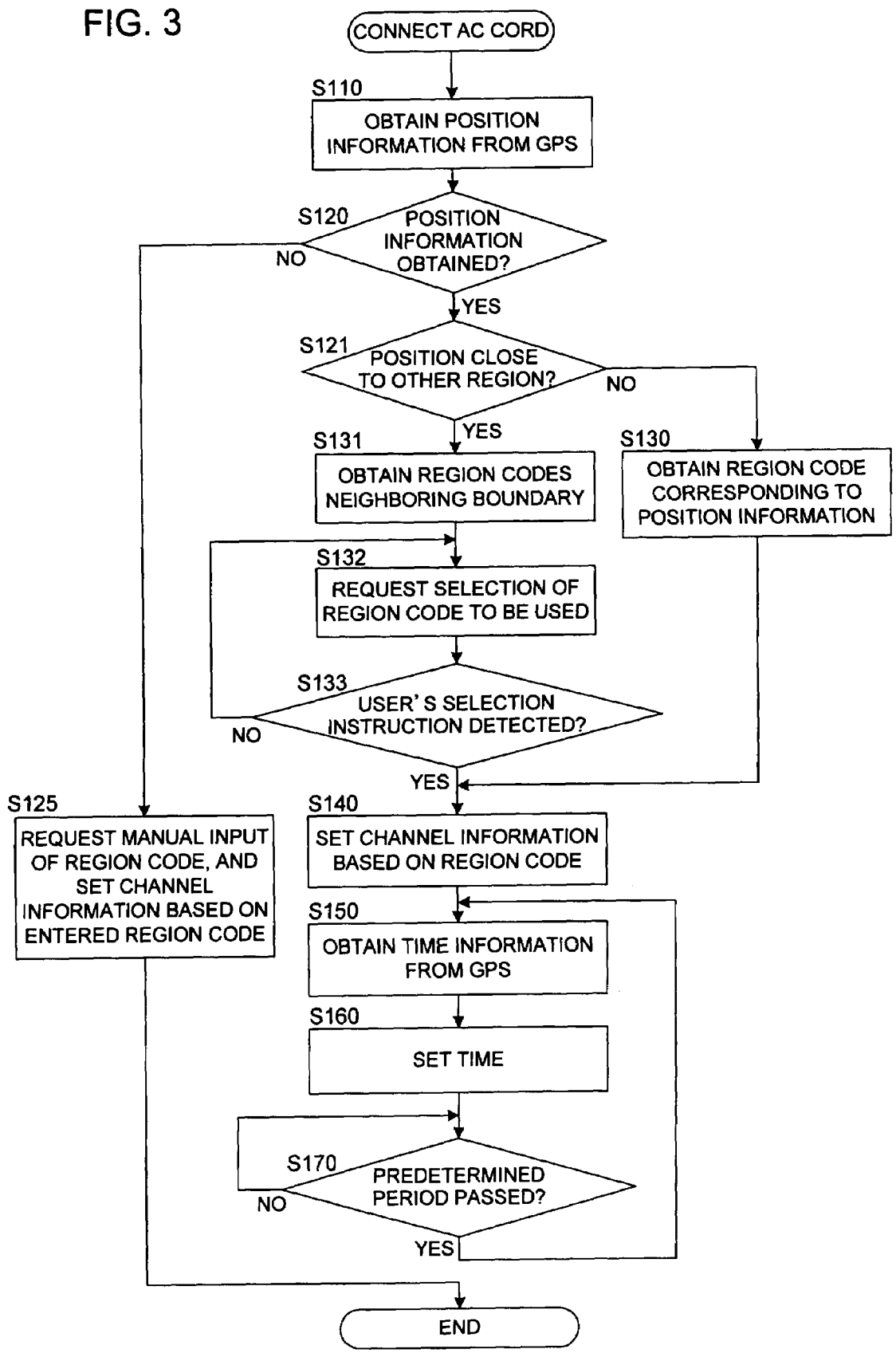

RECORDING DEVICE

This application is based on Japanese Patent Application No. 2006-205737 filed on Jul. 28, 2006, the contents of which are hereby incorporated by reference.

BACKGROUND OF THE INVENTION

1. Field of the Invention

The present invention relates to a recording device that can record picture information. In particular, the present invention relates to a recording device equipped with a GPS function for obtaining information of a position where the recording device is installed by using a global positioning system (GPS).

2. Description of Related Art

Recently, digital recording devices such as a DVD (Digital Versatile Disc) recorder or an HDD (Hard Disk Drive) recorder have become widely available as a device for recording pictures and sounds that are processed in an image processing apparatus such as a television set. Many of the recording devices are usually equipped with a tuner for receiving television broadcasting or the like.

Since available broadcasting stations (channels) that can be received are different depending on the region in ordinary television broadcasting, it is necessary to set information of available broadcasting stations (channel information) for each region in the tuner. This setting should be made by channel, and it is a common method nowadays to set the channel information by using a code number called a region code.

The region code is a number for identifying a region such as a prefecture or a city where the tuner, i.e., the recording device, is installed. When a user enters a region code corresponding to the region of installation, the recording device sets channel information that is optimal to the region of installation in the tuner.

Using such a region code, time and effort for setting the channel information can be saved substantially. However, if the region of installation is changed because of moving house or the like, it is inconveniently required to enter the region code again.

As to the problem described above, JP-A-2006-086730 discloses a television receiving apparatus that can always receive television broadcastings that are suitable for the region of installation and that does not require attention to the difference of broadcasting format even if the region of installation is changed.

The television receiving apparatus disclosed in JP-A-2006-086730 has a function of identifying position information of the television receiving apparatus and a function of determining a type of the television broadcasting standard according to the received electric wave. Then, the electric wave of the received television broadcasting is demodulated based on the obtained position information and the type of the television broadcasting standard.

More specifically, a table indicating a relationship between the type of the television broadcasting standard and the modulation format for each of the regions is stored in a memory portion. In addition, processing information for performing a demodulation process for each modulation format is stored in the memory portion. Then, the relationship stored in the memory portion is referred to, based on the obtained position information and the type of the television broadcasting standard. Thus, an appropriate modulation format of the current region is identified, and the processing information corresponding to the identified modulation format is read out from the memory portion, and the demodulating process is performed.

According to the structure described above, the modulation format is determined from the obtained position information and the type of the television broadcasting standard, so that setting of the modulation format of the television receiving apparatus in that region can be optimized automatically. Thus, it is possible to watch the television without paying attention to the modulation format in the region.

In addition, as to the problem described above, JP-A-2005-064718 discloses a digital broadcasting receiver that can obtain a service list from an area in which a reception state of the receiver is deemed advantageous and is capable of setting its receiving environment. Note that the service list is a list indicating a genre of the program that is broadcast in a transport stream of the received channel and a selection number for selecting the program.

The digital broadcasting receiver disclosed in JP-A-2005-064718 is equipped with a digital tuner that changes a reception frequency for seeking the broadcasting to be received, receives a digital broadcasting signal by scanning action, and identifying a plurality of channels that can be received. The digital broadcasting receiver separates network information table that includes broadcasting carrier information concerning each channel from the transport stream of the plurality of channels identified by the digital tuner. In addition, the digital broadcasting receiver stores in its memory portion discrimination information that can be used to discriminate for each of residential regions included in the network information table information. A residential region to which the discrimination information belongs is decided from the discrimination information, and the decided residential region is identified to be the current region.

According to the invention of JP-A-2005-064718, when a digital broadcasting receiver is installed, the service list can be obtained from the area in which a reception state of the receiver is advantageous, so that the user is not required to set a residential region of a viewer. Therefore, even if the region of installation of the receiver is changed or the receiver is moved, the service list can be obtained without putting a burden on the user.

However, the television receiving apparatus disclosed in the JP-A-2006-086730 cannot support a difference of the channel information between regions although it can support a difference of the modulation format between regions. In addition, the digital broadcasting receiver disclosed in JP-A-2005-064718 requires developing a new digital tuner that can identify a plurality of channels that can be received, so it needs high cost. In addition, if intensity of electric wave signal is low, it is difficult to obtain the service list. Furthermore, it is difficult to apply this apparatus to analog broadcasting.

SUMMARY OF THE INVENTION

An object of the present invention is to provide a recording device having high convenience that does not require a user to set channel information.

A recording device of the present invention includes a receiving portion that receives electric waves of television broadcasting, a recording portion that records the television broadcasting, a channel information storing portion that stores channel information in association with a code number corresponding to a region, the channel information being used for selecting a television broadcasting to be received, a channel information setting portion that sets the channel information corresponding to the code number for the receiving portion, a current position identifying portion that obtains current position information from GPS (global positioning system) satellites and a region identifying portion that decides a region of installation where the recording device is installed, based on the current position information. The channel information setting portion reads out a code number corresponding to the region of installation decided by the region identifying portion from the channel information storing portion, so as to set the channel information corresponding to the code number thus read out for the receiving portion.

According to this structure, when the recording device is connected to a power source and a main power is supplied, the current position identifying portion obtains position information of the recording device by using GPS satellites. Then, a region where the recording device is installed (e.g., a prefecture) is decided based on the obtained position information. Then, channel information that is appropriate for the decided region is read out from a storage medium such as a memory, and channel setting of the receiving portion such as a tuner of the recording device is performed by using the channel information thus read out. Since the GPS reception is performed, the broadcasting electric wave is not influenced by reception conditions, and the user is not required to perform the manual setting of channel information. Thus, a burden of work can be reduced, and setting errors of the channel information can be prevented.

In addition, the recording device of the present invention further includes a time circuit that has a timekeeping function, and the current position identifying portion obtains time information from the GPS satellites every predetermined period and sets time of the time circuit to be identical with the time information.

Therefore, time of the time circuit is adjusted automatically every time when the device is powered on and every predetermined period thereafter, so that a manual time adjusting work can be omitted. At the same time, correct time is always kept, so that timer reservation of a program can be performed correctly.

In addition, if the device cannot obtain the current position, it receives an input of the code number externally, so that channel information corresponding to the received code number is set for the receiving portion.

Therefore, even if the device cannot obtain the current position automatically, the user can set the channel information easily only by entering the code number to perform channel information settings.

In addition, the region identifying portion decides whether or not a distance between a position indicated by the current position information obtained by the current position identifying portion and a boundary line between a plurality of regions is a predetermined distance or shorter. If it is decided that the distance exceeds the predetermined distance, the channel information setting portion reads out a code number corresponding to the region of installation decided by the region identifying portion from the channel information storing portion, so as to set channel information corresponding to the code number thus read out for the receiving portion. If it is decided that the distance is the predetermined distance or shorter, the region identifying portion identifies each of code numbers corresponding to each of the plurality of regions, receives a selection input of a code number to be used from among the code numbers thus identified, and sets channel information corresponding to the code number thus received for the receiving portion.

Therefore, if the region of installation of the device is so close to other region that there is a possibility of an error in the case where the selection of region is performed automatically, the user can set an appropriate region code easily from among the plurality of region code candidates. Further, also in the case where the user's device can receive a channel in a neighboring region more easily due to the terrain or the like, the channel setting can be performed easily by selecting a desired code number manually.

BRIEF DESCRIPTION OF THE DRAWINGS

FIG. 3 is a process flowchart of a channel information setting process in a second embodiment of the present invention.

DETAILED DESCRIPTION OF PREFERRED EMBODIMENTS

Hereinafter, embodiments of the present invention will be described with reference to the attached drawings. Note that the embodiments described below are merely examples, and the present invention is not limited to these embodiments.

First Embodiment

Here, a structure of a main portion of an electric circuit system of a GPS-equipped HDD recorder 1 in a first embodiment of the present invention will be described with reference to the block diagram shown in FIG. 2.

Figure 2:
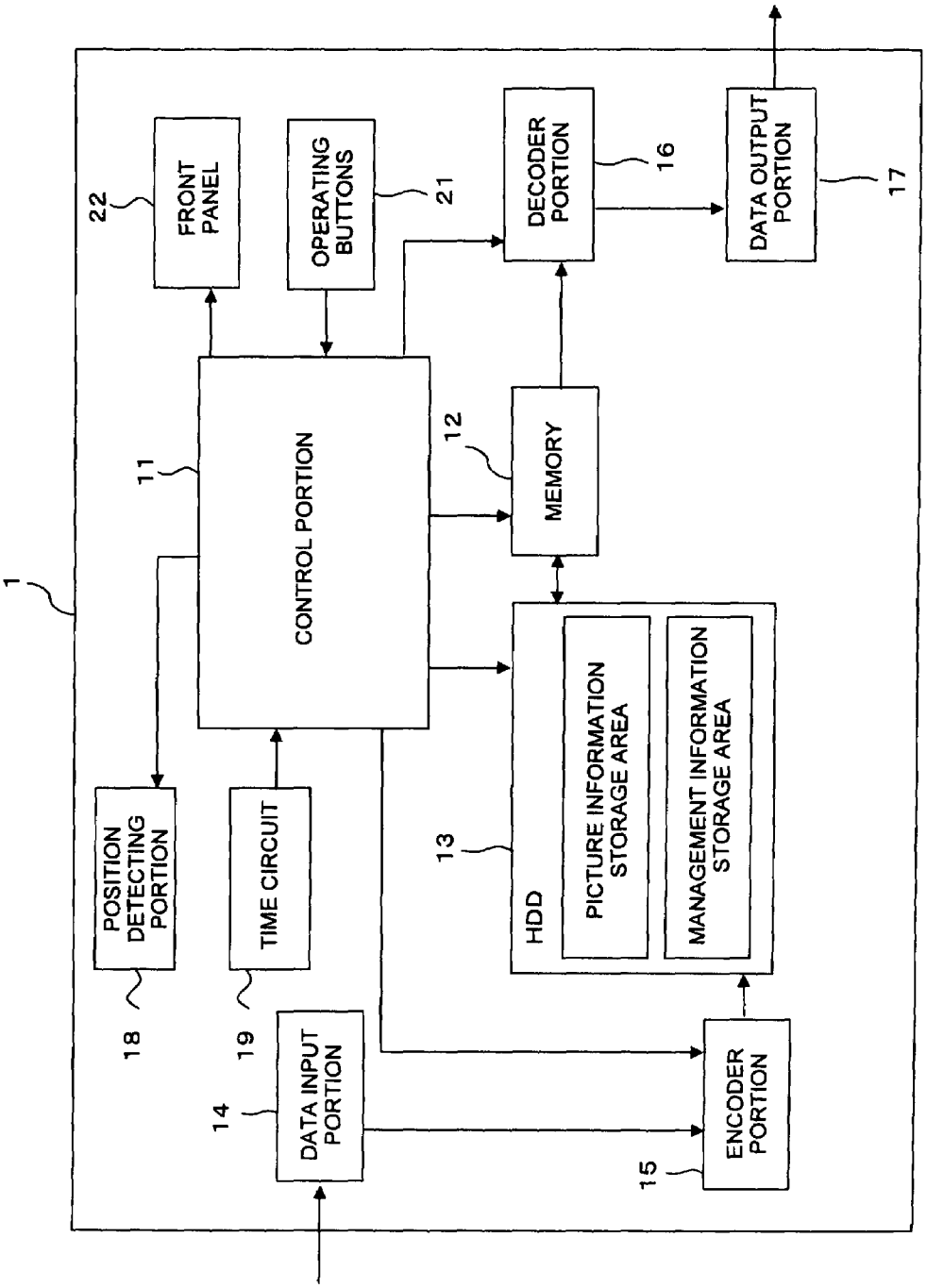
FIG. 2 is a block diagram showing a structure of a main portion of an electric circuit of a GPS-equipped HDD recorder according to the present invention.

As shown in the block diagram of FIG. 2, the GPS-equipped HDD recorder 1 of the present invention is so configured to include at least a control portion 11, a memory 12, an HDD 13, a data input portion 14, an encoder portion 15, a decoder portion 16, a data output portion 17, a position detecting portion 18, a time circuit 19, a set of operating buttons 21, and a front panel 22.

The control portion 11 is a central processing unit that controls actions of individual members of the GPS-equipped HDD recorder 1 so as to control picture information processing (recording of contents and the like). In addition, the control portion 11 is a brain portion that performs control of individual devices (e.g., the HDD 13 and the like), data calculation, data processing, and the like.

The memory 12 is a storage medium that temporarily stores individual data to be kept in the GPS-equipped HDD recorder 1, and it is made up of a writable RAM (Random Access Memory) or the like. The memory 12 serves as a buffer memory for temporarily storing processed data when the control portion 11 performs various types of information processing or instructions and commands received from a user.

The HDD 13 (recording portion) is a magnetic storage medium for recording picture data, audio data, management data, and the like to be kept in the GPS-equipped HDD recorder 1, and it also works as a channel information storing portion that stores channel information in association with a code number corresponding to a region. Other memory may be used as the channel information storing portion. It is preferable that the HDD 13 be divided into a plurality of areas (partitions) physically and that the different types of data (picture information, management information, and the like) are stored in different areas.

The data input portion 14 is an input interface for entering digital data (picture information) from an external device, for example, such as a digital tuner or the like. In addition, if analog data is entered, for example, the analog data (picture data and audio data) is converted into digital data by using an A/D (Analog to Digital) converter (not shown) before entering it.

The encoder portion 15 performs compression (encoding) of the picture data by a moving picture compression method such as MPEG2 or the like and compression of the audio data by a sound compression method such as Dolby AC-3, LPCM (Linear Pulse Code Modulation) or the like. Note that the data to be compressed are the picture data, audio data, and the like entered from the data input portion 14, for example.

The decoder portion 16 expands (decodes) the compressed picture data and audio data that are compressed by the encoder portion 15 or the like. The expanded data is delivered to external equipment by using a data output portion 17 or the like that will be described later, for example.

The data output portion 17 is an output interface for delivering the picture data and the audio data to an external device such as a monitor, for example. If a device as an output destination is equipped with only an analog interface, a D/A converter is used for converting the digital picture data and audio data into analog data before delivering them.

The position detecting portion 18 is a circuit for identifying a position where the GPS-equipped HDD recorder 1 is installed. The position detecting portion 18 uses a GPS receiver (not shown) for receiving electric waves from GPS satellites. Then, it extracts position information from the received electric wave for identifying a position of installation. The extracted position information is sent to the control portion 11.

The time circuit 19 is a circuit that counts current time, which is used for informing a user of the present time or as a trigger for starting the recording process in a recording reservation function.

The set of operating buttons 21 is an input interface for a user to issue various instructions including an instruction to record a program to the GPS-equipped HDD recorder 1. The front panel 22 displays various types of information of the GPS-equipped HDD recorder 1 for a user.

Here, a channel information setting process in the first embodiment of the present invention will be described with reference to the flowchart shown in FIG. 1 and the block diagram shown in FIG. 2.

Figure 1:
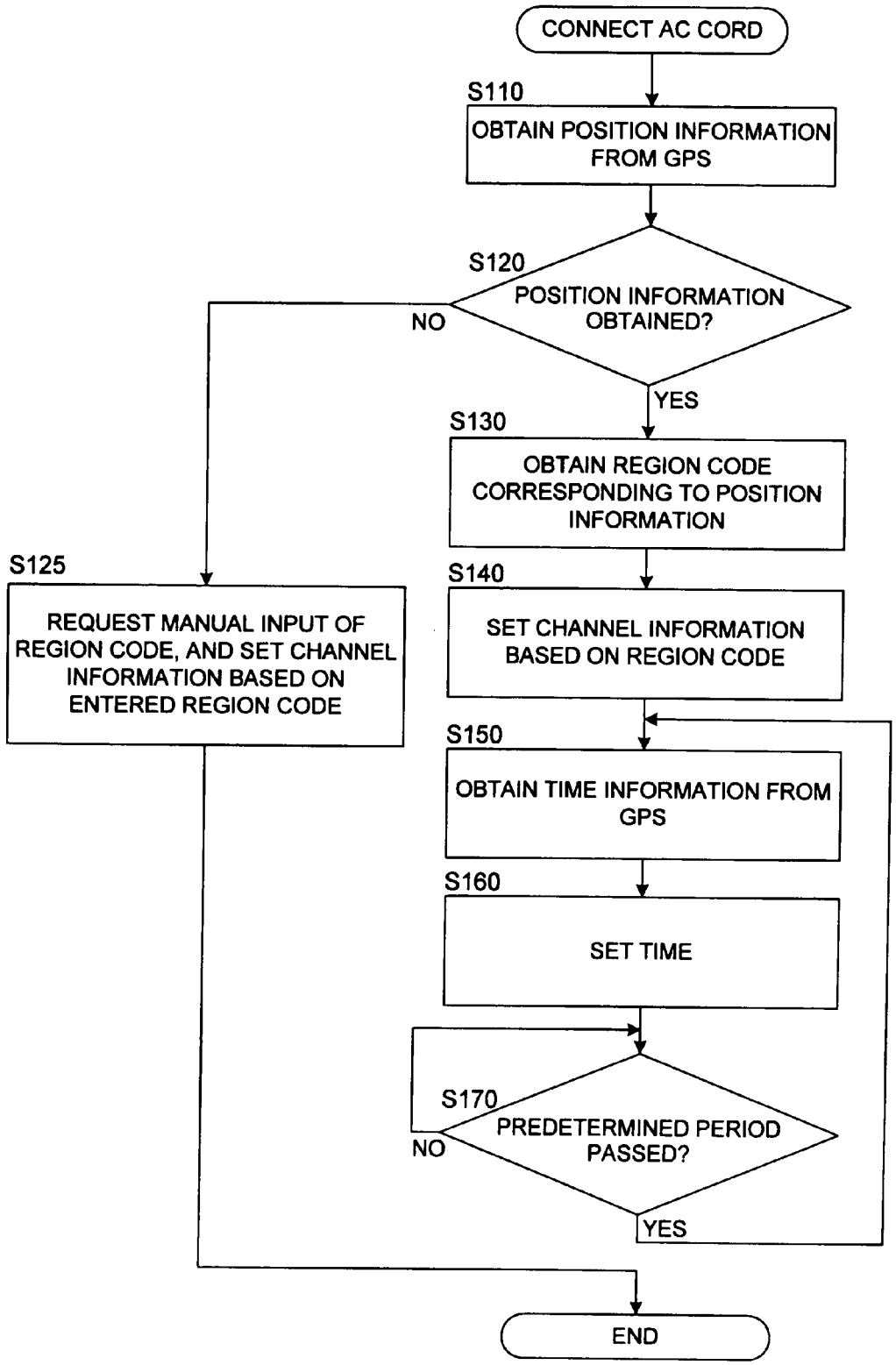
FIG. 1 is a process flowchart of a channel information setting process in a first embodiment of the present invention.

FIG. 1 is a flowchart showing a process flow of the channel information setting process according to the present invention. As shown in FIG. 1, this process is started when an AC cord (not shown) of the GPS-equipped HDD recorder 1 is connected to an external power source (e.g., an outlet of a commercial power source at home) so that the GPS-equipped HDD recorder 1 is powered on.

When the control portion 11 detects that the GPS-equipped HDD recorder 1 is powered on, it obtains a current position (a position where the GPS-equipped HDD recorder 1 is installed) by using the position detecting portion 18 in step S110. More specifically, the position detecting portion 18 communicates with GPS satellites on the orbits by using a GPS antenna (not shown). By this communication, it is identified which position on the earth the GPS-equipped HDD recorder 1 is installed at present. Information of the current position thus identified is stored temporarily in the memory 12. Therefore, the process in step S110 is performed by a current position identifying portion that obtains the position information from the GPS satellites. This current position identifying portion is made up of the position detecting portion 18 that extracts the position information, the control portion 11 that identifies the position from the extracted position information, and the like.

Next in step S120, the current position identifying portion decides whether or not the process of obtaining the current position in step S110 is succeeded. For example, there is a case where the position detecting portion 18 cannot communicate with the GPS satellites depending on the position of the GPS-equipped HDD recorder 1 or a time period when the communication with the GPS satellites is attempted. In this case, the current position cannot be obtained.

If the current position cannot be obtained, the current position identifying portion requests the user to set a region code manually in step S125. When the region code is entered, the channel information setting portion sets channel information in the tuner or the like (not shown). In this case, the control portion 11 serves as the channel information setting portion. After that, this process is finished. A message of requesting the user to enter a region code is displayed by using the front panel 22, for example. Alternatively, an OSD function may be used for displaying the message on a monitor (not shown).

On the contrary, if the current position can be obtained, a region identifying portion decides a region code corresponding to the obtained current position in step S130. More specifically, the HDD 13 stores table data in which the position information that is obtained from the GPS satellites is associated with the region code for setting the channel information. The region identifying portion reads out this table data and refers to it so as to obtain an appropriate region code. Therefore, the process of step S130 is performed by the region identifying portion that decides the region of installation of the recording device. This region identifying portion is made up of the control portion 11 that decides a region code corresponding to the position information of the obtained current position, the HDD 13 that stores the table data in which the position information is associated with the region code, and the like.

Next in step S140, the control portion 11 uses the region code obtained in step S130 for setting the channel information in the tuner or the like (not shown). Since procedures of the channel information setting process using the region code are the same as those in the conventional method, description thereof will be omitted here. Therefore, the process in step S140 is performed by the channel information setting portion. The control portion 11 serves as the channel information setting portion.

Next, in step S150, the current position identifying portion obtains time information from the GPS satellites. More specifically, the position detecting portion 18 communicates with GPS satellites on the orbits by using a GPS antenna (not shown). By this communication, time information (current time) at the position of the GPS-equipped HDD recorder 1 is identified. The current position identifying portion sets this time information in the time circuit 19 in step S160.

Next, in step S170, the current position identifying portion decides whether or not a predetermined period of time, e.g., one week, has passed after setting the time in the time circuit 19. If the predetermined period of time has not passed yet, the process of step S170 is performed repeatedly. On the contrary, if the predetermined period of time has passed, the process goes to step S150 in which the time setting process using the GPS satellites is performed again. Note that this process is performed repeatedly until functions of the GPS-equipped HDD recorder 1 are completely stopped when power supply through the AC cord is severed.

Second Embodiment

The inside structure of the GPS-equipped HDD recorder in a second embodiment is the same as that in the first embodiment, so description thereof will be omitted.

Here, the channel information setting process in the second embodiment of the present invention will be described with reference to the flowchart shown in FIG. 3 and the block diagram shown in FIG. 2. Note that the steps having the same contents as those in the first embodiment are denoted by the same step numbers, and descriptions thereof will be omitted.

FIG. 3 is a flowchart showing a process flow of the channel information setting process according to the present invention. As shown in FIG. 3, this process is started when an AC cord (not shown) of the GPS-equipped HDD recorder 1 is connected to an external power source (e.g., an outlet of a commercial power source at home) so that the GPS-equipped HDD recorder 1 is powered on.

Step S110, step S120 and step S125 are the same as those in the first embodiment, so descriptions thereof will be omitted. The region identifying portion made up of the control portion 11 and the like that succeeded in obtaining the current position in step S120 decides, next in step S121, whether or not the obtained current position is within a predetermined range from a boundary between regions.

The boundary between regions means a boundary line between regions indicated by the region codes. For example, if the region code exists for each prefecture, a boundary between prefectures corresponds to the boundary between regions. The region identifying portion compares the position information obtained in step S120 with map information stored in the HDD 13 in advance, so as to decide whether or not a boundary between regions exists within a predetermined range (e.g., within a circle having a radius of 5 km) from the current position.

If it is decided that a boundary between regions does not exist within the predetermined range in a step S121, the process goes to steps S130 to S170. Since procedures in steps S130 to S170 are the same as those in the first embodiment, descriptions thereof will be omitted here. On the contrary, if it is decided that a boundary between regions exists within the predetermined range in step S121, the process goes to the next step S131.

The region identifying portion identifies a plurality of regions existing within a predetermined range from the current position in step S131, based on the boundary between regions obtained in the S121. Then, region codes corresponding to these individual regions are obtained. For example, if it is decided that the current position is located within the predetermined range from a boundary between Osaka prefecture and Nara prefecture, two region codes of Osaka prefecture and Nara prefecture that neighbor the boundary between regions are obtained.

Next, the region identifying portion issues a request for selection to the user in step S132, so that the user selects one of the plurality of region codes obtained in step S131 for performing channel setting. A message for the request for selection of the region code is displayed by using the front panel 22 or by using the OSD function to display on the monitor (not shown), for example.

Next, in step S133, the region identifying portion decides whether or not a response to the request for selection of the region code is detected. If it is not detected, the process goes back to step S132 and issues request for selection of the region code again. On the contrary, if it is detected, the process goes to steps S140 to S170. Since the procedures in steps S140 to S170 are the same as those in the first embodiment, descriptions thereof will be omitted here.

Other Embodiments

Although the present invention is described with the first and the second embodiments above, the present invention is not limited to the above-described embodiments but can be modified variously in the scope of its technical concept.

For example, a storage medium that stores program codes of software for realizing the functions of the embodiments described above may be supplied to the GPS-equipped HDD recorder 1, so that a computer (e.g., a CPU) in the GPS-equipped HDD recorder 1 reads out the program codes stored in the storage medium and executes them for realizing the present invention.

In this case, the program codes read out from the storage medium realize the functions of the embodiment described above, and the storage medium storing the program codes constitutes the present invention.

As the storage medium for supplying the program codes, a flexible disc, a hard disk, an optical disc, a magneto-optic disk, a magnetic tape, a nonvolatile memory card, a ROM, or the like can be used, for example.

In addition, instead of the structure in which the computer reads out the program codes and executes them so as to realize the functions of the embodiment described above, it is also possible to adopt another structure in which an OS (operating system) or the like working on the computer performs a part or a whole of the real process based on an instruction from the program codes, and the process realizes the functions of the embodiment described above.

Furthermore, it is possible to adopt another structure in which program codes read out from a storage medium are written in a memory that is provided in an expanded function board inserted into the computer or an expanded function unit connected to the computer, and a CPU or the like of the expanded function board or the expanded function unit executes a part or a whole of the real process based on an instruction of the program codes so that the functions of the embodiment described above are realized by the process.

In addition, if the picture information processing method of the present invention is used in other recording device except the GPS-equipped HDD recorder, the same effect will be obtained. Note that the recording device may be a DVD recorder, a DV (digital video) recorder, a personal computer, a digital video camera, or the like, for example.

Although the external power supply to the GPS-equipped HDD recorder via the AC cord is used as a trigger for starting the process in the present embodiment, other triggers, e.g., issuance of a command to initialize the channel information based on a user's operation, may be used for starting the process.

In addition, although a boundary between prefectures is exemplified as a boundary between regions in the present embodiment, other boundaries, e.g., a boundary between municipalities or the like, may be used as the boundary between regions.

In addition, although identifying the region to which the current position belongs is performed by referring to the map information stored in the hard disk in the present embodiment, it is possible to identify the region based on map information obtained externally by using a communication network.

What is claimed is:

1. A recording device comprising:
a receiving portion that receives electric waves of television broadcasting;
a recording portion that records the television broadcasting;
a channel information storing portion that stores channel information in association with a code number corresponding to a region, the channel information being used for selecting a television broadcasting to be received;
a channel information setting portion that sets the channel information corresponding to the code number for the receiving portion;
a current position identifying portion that obtains current position information from GPS (global positioning system) satellites; and
a region identifying portion that decides a region of installation where the recording device is installed, based on the current position information,
wherein the region identifying portion decides whether or not a distance between a position indicated by the current position information obtained by the current position identifying portion and a boundary line between a plurality of regions is a predetermined distance or shorter,
if it is decided that the distance exceeds the predetermined distance, the channel information setting portion reads out a code number corresponding to the region of installation decided by the region identifying portion from the channel information storing portion, so as to set channel information corresponding to the code number thus read out for the receiving portion, and
if it is decided that the distance is the predetermined distance or shorter, the region identifying portion identifies each of code numbers corresponding to each of the plurality of regions, receives a selection input of a code number to be used from among the code numbers thus identified, and sets channel information corresponding to the code number thus inputted for the receiving portion.

2. The recording device according to claim 1, further comprising:
a time circuit that has a timekeeping function,
wherein the current position identifying portion obtains time information from the GPS satellites and sets time of the time circuit to be identical with the time information every predetermined period.

3. The recording device according to claim 1, wherein if the current position identifying portion cannot obtain the current position, the current position identifying portion receives an input of the code number externally, so that channel information corresponding to the received code number is set for the receiving portion.

4. The recording device according to claim 1, wherein the recording portion is a hard disk, and the recording device is a hard disk recorder.

* * * * *